(12) United States Patent
Arbesman

(10) Patent No.: US 11,214,039 B2
(45) Date of Patent: Jan. 4, 2022

(54) PROCESS FOR MANUFACTURING TEXTURED LAMINATE SHEET

(71) Applicant: GRIPMETAL LIMITED, Dublin (IE)

(72) Inventor: Ray Arbesman, Toronto (CA)

(73) Assignee: GRIPMETAL LIMITED, Dublin (IE)

( * ) Notice: Subject to any disclaimer, the term of this patent is extended or adjusted under 35 U.S.C. 154(b) by 0 days.

(21) Appl. No.: 16/396,225

(22) Filed: Apr. 26, 2019

(65) Prior Publication Data

US 2019/0248109 A1    Aug. 15, 2019

Related U.S. Application Data

(62) Division of application No. 15/388,492, filed on Dec. 22, 2016, now Pat. No. 10,315,382.

(51) Int. Cl.
*B32B 7/08*   (2019.01)
*B32B 3/06*   (2006.01)
(Continued)

(52) U.S. Cl.
CPC .............. *B32B 7/08* (2013.01); *B21D 39/00* (2013.01); *B32B 3/06* (2013.01); *B32B 3/266* (2013.01);
(Continued)

(58) Field of Classification Search
CPC .. B32B 7/08; B32B 7/022; B32B 7/04; B32B 3/06; B32B 3/28; B32B 3/266; B32B 3/30; B32B 3/12; B32B 5/18; B32B 5/32; B32B 5/09; B32B 15/046; B32B 15/10; B32B 15/08; B32B 15/06; B32B 15/043; B32B 15/20; B32B 15/18; B32B 15/085; B32B 15/09; B32B 38/06; B32B 37/20; B32B 37/0053; B32B 2605/18; B32B 9/007;
(Continued)

(56) References Cited

U.S. PATENT DOCUMENTS

| | | |
|---|---|---|
| 1,897,088 A | 2/1933 | Victor |
| 1,915,221 A | 6/1933 | Fitzgerald |

(Continued)

FOREIGN PATENT DOCUMENTS

| | | |
|---|---|---|
| CA | 1118179 | 2/1982 |
| CA | 2038152 | 9/1992 |

(Continued)

OTHER PUBLICATIONS

Graphite Sheet Gaskets, Environmental Gasket Company LTD., copyright 2009, 2009, 5 pages.

(Continued)

*Primary Examiner* — Michael Zhang
(74) *Attorney, Agent, or Firm* — Brooks Kushman P.C.

(57) ABSTRACT

A process for producing a textured laminate sheet includes a) positioning a substrate material adjacent a barbed face of a metal sheet. The barbed face has a plurality of barbs, and the metal sheet has an opposed face opposite the barbed face. The process further includes b) forcing the metal sheet and the substrate material together to impale the substrate material on the barbs and secure the substrate material and the metal sheet together as a laminate sheet, and c) debossing the opposed face to form a plurality of depressions in the laminate sheet and texture the laminate sheet.

10 Claims, 8 Drawing Sheets

(51) Int. Cl.
  *B32B 3/28*    (2006.01)
  *B32B 5/18*    (2006.01)
  *B32B 3/26*    (2006.01)
  *B32B 15/04*   (2006.01)
  *B32B 15/10*   (2006.01)
  *B32B 15/08*   (2006.01)
  *B32B 15/06*   (2006.01)
  *B32B 15/20*   (2006.01)
  *B32B 38/06*   (2006.01)
  *B21D 39/00*   (2006.01)
  *B32B 37/20*   (2006.01)
  *B32B 37/00*   (2006.01)

(52) U.S. Cl.
  CPC ............... *B32B 3/28* (2013.01); *B32B 5/18* (2013.01); *B32B 15/043* (2013.01); *B32B 15/046* (2013.01); *B32B 15/06* (2013.01); *B32B 15/08* (2013.01); *B32B 15/10* (2013.01); *B32B 15/20* (2013.01); *B32B 38/06* (2013.01); *B32B 37/0053* (2013.01); *B32B 37/20* (2013.01); *B32B 2605/18* (2013.01); *Y10T 29/49835* (2015.01); *Y10T 29/49837* (2015.01); *Y10T 29/49936* (2015.01); *Y10T 29/49966* (2015.01)

(58) Field of Classification Search
  CPC . B32B 9/04; B32B 2307/732; B32B 2479/00; B32B 2607/00; B32B 2419/00; B32B 2605/08; B32B 27/32; B32B 27/25; B32B 27/045; B32B 27/065; B32B 27/08; B32B 25/08; B32B 25/032; B32B 25/042; B32B 25/045; B32B 21/08; B32B 21/042; B32B 21/045; B32B 21/047; B32B 9/042; B32B 9/0421; B32B 9/043; B32B 9/046; B32B 9/045; B32B 2250/03; B32B 2250/40; B21D 39/00; Y10T 29/49837; Y10T 29/49835; Y10T 29/49936; Y10T 29/49966
  See application file for complete search history.

(56) References Cited

U.S. PATENT DOCUMENTS

| | | |
|---|---|---|
| 2,171,530 A | 9/1939 | Balfe |
| 2,255,268 A | 9/1941 | Perrine |
| 2,274,765 A | 3/1942 | Zalkind |
| 2,781,097 A | 2/1957 | Nold |
| 3,557,407 A | 1/1971 | Lemelson |
| 3,605,360 A | 9/1971 | Lindal |
| 3,615,994 A | 10/1971 | MacLaine et al. |
| 4,023,613 A | 5/1977 | Uebayasi et al. |
| 4,234,638 A | 11/1980 | Yamazoe et al. |
| 4,569,424 A | 2/1986 | Taylor, Jr. |
| 4,640,390 A | 2/1987 | Saumweber et al. |
| 4,653,242 A | 3/1987 | Ezard |
| 4,705,278 A | 11/1987 | Locacius et al. |
| 4,723,783 A | 2/1988 | Belter et al. |
| 4,776,602 A | 10/1988 | Gallo et al. |
| 4,781,389 A | 11/1988 | Beyer et al. |
| 4,799,579 A | 1/1989 | Myers et al. |
| 4,911,972 A | 3/1990 | Mercuri |
| 5,031,483 A | 7/1991 | Weaver |
| 5,172,920 A | 12/1992 | Schlenk |
| 5,362,074 A | 11/1994 | Gallo et al. |
| 5,376,410 A | 12/1994 | MacKelvie et al. |
| D374,609 S | 10/1996 | Akeno |
| D376,533 S | 12/1996 | Akeno |
| 5,611,122 A | 3/1997 | Torigoe et al. |
| 5,689,990 A * | 11/1997 | Deeley ............... B29C 59/04 72/196 |
| 5,732,800 A | 3/1998 | Spigener |
| 5,738,924 A | 4/1998 | Sing |
| 5,788,247 A | 8/1998 | Tensor |
| 5,879,489 A | 3/1999 | Burns et al. |
| D425,405 S | 5/2000 | Naohara et al. |
| 6,247,704 B1 | 6/2001 | Battistoni et al. |
| 6,258,457 B1 | 7/2001 | Ottinger et al. |
| 6,276,045 B1 | 8/2001 | Buchi et al. |
| 6,383,678 B1 | 5/2002 | Kaneko et al. |
| 6,431,331 B1 | 8/2002 | Arbesman et al. |
| 6,464,047 B1 | 10/2002 | Arbesman |
| 6,622,346 B2 | 9/2003 | Graham et al. |
| 6,671,935 B2 | 1/2004 | Filion et al. |
| 6,684,479 B2 | 2/2004 | Wang et al. |
| 6,843,095 B2 | 1/2005 | Arbesman |
| 6,860,368 B2 | 3/2005 | Kulis, Jr. et al. |
| 6,913,673 B2 | 7/2005 | Baggot et al. |
| 7,222,701 B2 | 5/2007 | Pham et al. |
| 7,320,386 B2 | 1/2008 | Kulis, Jr. et al. |
| 7,686,142 B2 | 3/2010 | Jung |
| 7,841,052 B2 | 11/2010 | Ducauchuis |
| 7,989,049 B2 | 8/2011 | Potier |
| 8,048,507 B2 | 11/2011 | Townsend et al. |
| 8,088,316 B2 | 1/2012 | Muth et al. |
| 8,683,840 B2 | 4/2014 | Tuma et al. |
| 8,685,520 B2 | 4/2014 | Meyer et al. |
| 9,259,899 B1 | 2/2016 | Arbesman |
| 9,273,741 B1 | 3/2016 | Arbesman et al. |
| 9,291,225 B2 | 3/2016 | Arbesman et al. |
| 9,360,067 B1 | 6/2016 | Arbesman et al. |
| 9,388,872 B1 | 6/2016 | Arbesman et al. |
| 2002/0169435 A1 | 11/2002 | Neeb et al. |
| 2002/0170789 A1 | 11/2002 | Poelemans et al. |
| 2003/0127291 A1 | 7/2003 | Wood et al. |
| 2004/0016608 A1 | 1/2004 | Gutowski |
| 2004/0099493 A1 | 5/2004 | Himmelsbach et al. |
| 2004/0140165 A1 | 7/2004 | Pham et al. |
| 2005/0170157 A1 | 8/2005 | Armela et al. |
| 2006/0087053 A1 | 4/2006 | O'Donnell et al. |
| 2006/0093802 A1 | 5/2006 | Tsai et al. |
| 2006/0243017 A1 | 11/2006 | Jung et al. |
| 2006/0246256 A1 | 11/2006 | Ausen et al. |
| 2008/0003401 A1 | 1/2008 | Barnes et al. |
| 2008/0217809 A1 | 9/2008 | Zhao et al. |
| 2009/0223753 A1 | 9/2009 | Kappagantu et al. |
| 2010/0170758 A1 | 7/2010 | Chen et al. |
| 2010/0207334 A1 | 8/2010 | Virgin et al. |
| 2011/0079065 A1* | 4/2011 | Cabanski ............... B21D 28/10 72/203 |
| 2011/0233875 A1 | 9/2011 | Shaver et al. |
| 2011/0260371 A1 | 10/2011 | Arora et al. |
| 2012/0003462 A1 | 1/2012 | Wong et al. |
| 2012/0006959 A1 | 1/2012 | Braun et al. |
| 2012/0064298 A1 | 3/2012 | Orr et al. |
| 2013/0152654 A1 | 6/2013 | Arbesman et al. |
| 2013/0224512 A1 | 8/2013 | Zurfluh et al. |
| 2015/0024231 A1 | 1/2015 | Kutsumiza et al. |
| 2015/0053517 A1* | 2/2015 | Arbesman ............. F16D 65/092 188/251 A |
| 2015/0086750 A1 | 3/2015 | Arbesman et al. |
| 2015/0099093 A1 | 4/2015 | Arbesman et al. |
| 2015/0140255 A1 | 5/2015 | MacKelvie |
| 2015/0204400 A1 | 7/2015 | Arbesman et al. |
| 2015/0239201 A1 | 8/2015 | Walker |
| 2016/0023311 A1* | 1/2016 | Arbesman ............. B23P 15/246 29/432 |
| 2016/0046110 A1 | 2/2016 | Broering et al. |
| 2016/0091041 A1 | 3/2016 | Arbesman |
| 2016/0167341 A1* | 6/2016 | Arbesman ........... F16D 65/0971 428/172 |
| 2016/0176152 A1 | 6/2016 | MacKelvie |
| 2016/0230792 A1 | 8/2016 | Arbesman et al. |

FOREIGN PATENT DOCUMENTS

| | | |
|---|---|---|
| CA | 1337622 | 11/1995 |
| CA | 2272115 | 11/1999 |
| CA | 2300401 | 12/1999 |

(56) References Cited

FOREIGN PATENT DOCUMENTS

| | | |
|---|---|---|
| CA | 2391183 | 12/2003 |
| CA | 145893 | 12/2013 |
| CA | 2855378 | 1/2016 |
| CN | 1599846 | 3/2005 |
| CN | 1286625 | 11/2006 |
| CN | 102272471 | 12/2011 |
| CN | 203404286 | 1/2014 |
| DE | 19754740 | 3/1999 |
| DE | 102004048464 | 4/2006 |
| DE | 102006015100 | 10/2007 |
| DE | 102006015145 | 10/2007 |
| DE | 102006015148 | 10/2007 |
| EP | 0934820 | 8/1999 |
| EP | 1090728 | 4/2001 |
| GB | 2359186 | 8/2001 |
| GB | 2507128 | 4/2014 |
| JP | 59174431 | 11/1984 |
| JP | 04003136 | 1/1992 |
| JP | 8021462 | 1/1996 |
| JP | 11309524 | 11/1999 |
| JP | 2013012626 | 1/2013 |
| JP | 2013089799 | 5/2013 |
| WO | 0000344 | 1/2000 |
| WO | 02090792 | 11/2002 |
| WO | 2011051724 | 5/2011 |
| WO | WO-2015010183 A1 * 1/2015 ............ B32B 9/041 |

OTHER PUBLICATIONS

Graphite Sheet with Tanged Metal data sheet, Cixi CAZseal Packing & Gasket Co., Ltd., 1 page.

SL T-20 Tang Sheet Specifications Datasheet, Dynoteq Kft, 1 page.

Specification Sheet: SPG7003, SPG Gaskets Co., 1 page.

Supagraf Expanded Graphite Jointings data sheet, James Walker & Co., 1 page.

Tanged Graphite Datasheet, Alba Gaskets-Tanged Graphite data I specification sheet, 1 page.

Fanged Metal Reinforced Graphite Gasket data sheet, Ningbo Sunwell Fluid Technologies Co., Ltd., 2010, 1 page.

Fanged Stainless Steel Reinforced Graphite Sheet data sheet, Gee Graphite, 1 page.

\* cited by examiner

PROCESS FOR MANUFACTURING TEXTURED LAMINATE SHEET

CROSS-REFERENCE TO RELATED APPLICATIONS

This application is a division of U.S. application Ser. No. 15/388,492 filed Dec. 22, 2016, now U.S. Pat. No. 10,315,382, issued Jun. 11, 2019, the disclosure of which is hereby incorporated in its entirety by reference herein.

FIELD

This document relates to laminate sheets, such as laminate sheets that may be used as structural panels or in aerospace applications. More specifically, this document relates to textured laminate sheets, processes for manufacturing textured laminate sheets, and apparatuses for manufacturing textured laminate sheets.

BACKGROUND

U.S. Pat. No. 9,254,634 (Arbesman et al.) discloses a process for making stiff, lightweight laminate materials. At least one sheet of textured lamina having raised pointed structures is forced against a softer plain lamina so as to embed the structures therein. The pointed structures are raised from grooves carved into the surface of the sheet material by means of a set of teeth carried on a knife element. The pointed structures may pierce through the softer lamina such that the protruding tips may be bent over or clinched to prevent their easy withdrawal. Two such texturized lamina may be used to sandwich and pierce through the softer lamina and are co-clinched by the other. In this way a light and stiff laminate is created.

SUMMARY

The following summary is intended to introduce the reader to various embodiments of the disclosure, but not to define or delimit any invention.

According to some embodiments, a process for producing a textured laminate sheet includes a) positioning a substrate material adjacent a barbed face of a metal sheet. The barbed face has a plurality of barbs, and the metal sheet has an opposed face opposite the barbed face. The process further includes b) forcing the metal sheet and the substrate material together to impale the substrate material on the barbs and secure the substrate material and the metal sheet together as a laminate sheet, and c) debossing the opposed face to form a plurality of depressions in the laminate sheet so as to texture the laminate sheet.

In some embodiments, the opposed face is non-barbed.

In some embodiments, some or all of the depressions extend from the second face into the substrate material. The substrate material may have a first face adjacent the barbed face and a second face opposite the first face, and step c) may include maintaining the second face as planar and non-textured.

In some embodiments, the substrate material has a first face adjacent the barbed face and an opposed second face, and the process further includes d) securing a second metal sheet to the second face of the substrate material. The second metal sheet can have a second barbed face with a second plurality of barbs, and a second opposed face. Step d) may be carried out concurrently with step b), and may include forcing the second metal sheet and the substrate material together to impale the substrate material on the second plurality of barbs.

In some embodiments, the plurality of depressions are arranged in a regular pattern. The plurality of depressions may include an array of dimples.

In some examples, steps b) and c) are carried out by a securing and texturing apparatus. In some examples, steps b) and c) may be carried out by a single press of the securing and texturing apparatus. Steps b) and c) may include actuating the press to force a plate against the metal sheet and the substrate material to impale the substrate material on the barbs and then deboss the opposed face.

In some embodiments, step b) includes passing the metal sheet and the substrate material between a pair of securing rollers of the securing and texturing apparatus. Step c) may include passing the laminate sheet between a pair of texturing rollers of the securing and texturing apparatus. The texturing rollers may include a first roller with a substantially flat contact surface, and a second roller having a contact surface with raised features.

In some embodiments, the process further includes heating at least one of the metal sheet and the substrate material prior to step c), or prior to step b). Heating at least one of the metal sheet and the substrate material may include passing the metal sheet and the substrate material between a pair of heating rollers.

In some embodiments, the substrate material includes plastic, rubber, wood, foam, metal, or a combination thereof.

In some embodiments, the barbed face has a barbed face footprint, the substrate material has a first face adjacent the barbed face, and the first face has a first face surface area. The first face surface area can be less than the barbed face footprint. For example, the substrate material may be a latticed sheet having openings therethrough.

According to some embodiments, a process for producing a textured laminate sheet includes supplying a laminate sheet to a texturing apparatus. The laminate sheet includes (i) a metal sheet having a barbed face with a plurality of barbs, and an opposed face opposite the barbed face, and (ii) a substrate material adjacent the barbed face and impaled on the barbs. The process further includes, in the texturing apparatus, debossing the opposed face to form a plurality of depressions in the laminate sheet and texture the laminate sheet.

In some embodiments, some or all of the depressions extend from the opposed face into the substrate material. The substrate material may have a first face adjacent the barbed face and a second face opposite the first face, and step c) may include maintaining the second face as planar and non-textured.

In some embodiments, the substrate material has a first face adjacent the barbed face and a second face opposite the first face, and the laminate sheet further includes a second metal sheet secured to the second face of the substrate material. The second metal sheet can have a second barbed face with a second plurality of barbs, and a second opposed face.

In some embodiments, the plurality of depressions are arranged in a regular pattern. The plurality of depressions can include an array of dimples.

In some embodiments, step b) includes actuating a press to deboss the opposed face. In some examples step b) includes passing the laminate sheet between a pair of texturing rollers of the texturing apparatus. The texturing rollers can include a first roller having a substantially flat contact surface, and a second roller having a contact surface with raised features.

In some embodiments, the process further includes heating at least one of the metal sheet and the substrate material prior to step b). Heating at least one of the metal sheet and the substrate material may include passing the metal sheet and the substrate material between a pair of heating rollers.

In some embodiments, the substrate material includes plastic, rubber, wood, foam, metal, or a combination thereof.

In some embodiments, the barbed face has a barbed face footprint, the substrate material has a first face adjacent the barbed face, and the first face has a first face surface area. The first face surface area may be less than the barbed face footprint. For example, the substrate material can be a latticed sheet having openings therethrough.

According to some embodiments, a textured laminate sheet includes a metal sheet having a barbed face with a plurality of barbs, and an opposed face opposite the barbed face. A substrate material is adjacent the barbed face and is impaled on the barbs. A plurality of depressions is formed in and textures the opposed face.

In some embodiments, some or all of the depressions extend from the opposed face into the substrate material. The substrate material may have a first face adjacent the barbed face, and a second face opposite the first face, and the second face can be non-textured.

In some embodiments, the depressions are arranged in a regular pattern. The plurality of depressions can include an array of dimples.

In some embodiments, the barbed face has a barbed face footprint, the substrate material has a first face adjacent the barbed face, and the first face has a first face surface area. The first face surface area may be less than the barbed face footprint. For example, the substrate material can be a latticed sheet having openings therethrough.

In some embodiments, the metal sheet has a metal sheet thickness, the substrate material has a substrate material thickness, and the metal sheet thickness is less than the substrate thickness.

In some embodiments, the substrate material includes at least one of plastic, rubber, wood, foam, metal or a combination thereof.

In some embodiments, the metal sheet is secured to a first face of the substrate material, and the substrate material further includes a second face opposite the first face. The textured laminate sheet can further include a second metal sheet having a second barbed face with a second plurality of barbs, and a second opposed face. The second face of the substrate material may be impaled on the second plurality of barbs to secure the substrate material to the second metal sheet. In some examples, the second metal sheet is non-textured.

According to some embodiments, a securing and texturing apparatus for producing a textured laminate sheet includes a pair of securing rollers configured to receive a substrate material and a metal sheet and force the substrate material and the metal sheet together to impale the substrate material on a plurality of barbs of the metal sheet, to secure the substrate material and metal sheet together as a laminate sheet. The apparatus further includes a pair of texturing rollers downstream of the pair of securing rollers. The pair of texturing rollers includes at least one contact surface with raised features. The pair of texturing rollers receives the laminate sheet from the pair of securing rollers and presses the raised features into the metal sheet to deboss the laminate sheet.

In some embodiments, the pair of texturing rollers includes a first roller with a generally flat contact surface, and a second roller having the contact surface with the raised features.

In some examples, the raised features include an array of dimple negatives.

In some embodiments, the apparatus further includes a pair of heating rollers located upstream from the pair of securing rollers. The pair of heating rollers configured to heat the metal sheet and the substrate material.

According to some embodiments, a securing and texturing apparatus for producing a textured laminate sheet includes a lower plate for receiving a substrate material and a metal sheet, and an upper plate positioned substantially above the lower plate. At least one of the upper plate and the lower plate has a contact surface with raised features. The apparatus further includes a press, which is operable in a first stage and a second stage. In the first stage, the upper plate is moved a first distance with respect to the lower plate to force the metal sheet towards the substrate material and impale the substrate material on barbs of the metal sheet. In the second stage, the upper plate is moved a second distance with respect to the lower plate to deboss the metal sheet with the raised features.

In some embodiments, the raised features include an array of dimple negatives.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1b is an enlarged view of the circled portion of the textured laminate sheet of FIG. 1a;

FIG. 4b is an enlarged view of the circled portion of the textured laminate sheet of FIG. 4a;

DETAILED DESCRIPTION

Figure 1A:
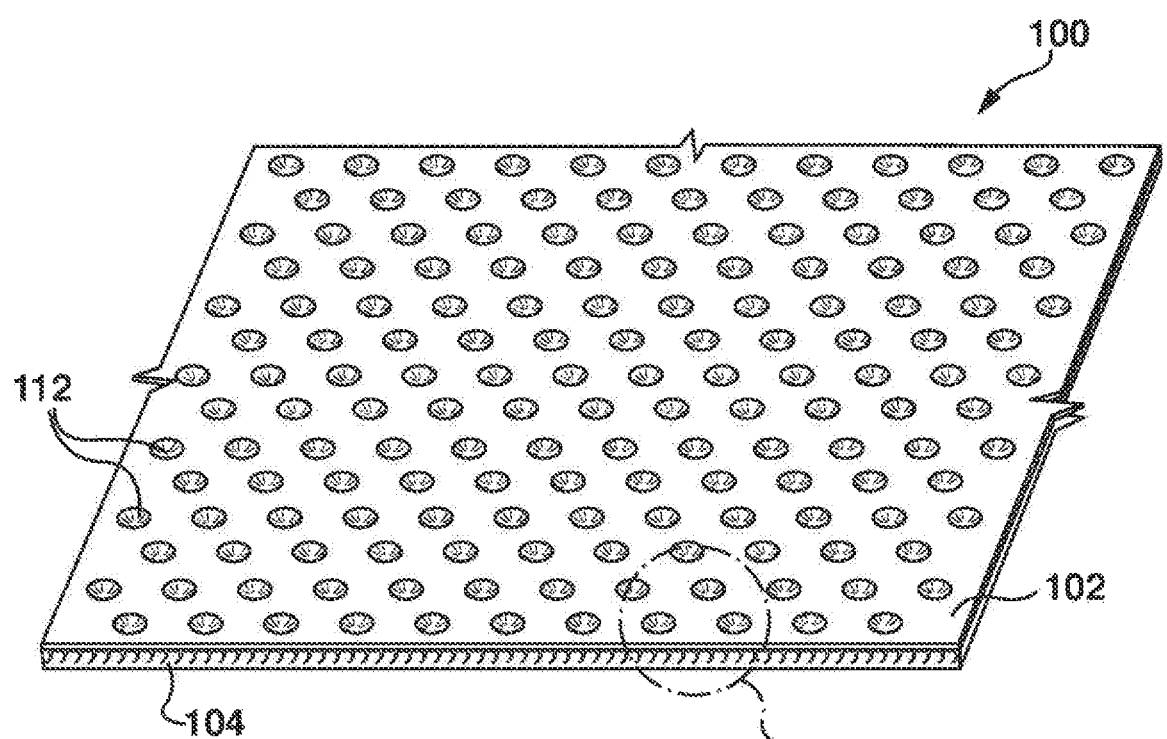
FIG. 1a is a partial perspective view of a textured laminate sheet.

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein are textured laminate sheets that generally include a metal sheet and a substrate material. The metal sheet can have a face that is textured with a plurality of barbs (i.e. a barbed face), and an opposed face that is opposite the barbed face. The metal sheet and the substrate material can be secured together by impaling the substrate material on the barbs of the metal sheet. The resulting laminate is then textured with depressions, which may be in the form of an array, such as an array of dimples. For example, the laminate sheet may be textured by debossing (i.e. creating recessed features in) the opposed face of the metal sheet. Some or all of the depressions can extend from the opposed face into the substrate material.

This texturing can result in a laminate that is generally stiff and strong, while still being relatively lightweight. For example, the debossing may result in the deformation of some or all of the barbs, which may lock the barbs into the substrate material and strengthen the bond between the metal sheet and the substrate material. Furthermore, the textured laminate sheet may be less prone to shear failure, due to the non-planar joint between the metal sheet and the substrate material (the non-planar joint being a result of the dimples). Furthermore, the laminate sheet may have increased flexural stiffness. This can make the laminate sheet useful in structural applications, for example in the construction industry.

In addition, this texturing can enhance the aerodynamic properties of the laminate sheet, akin to the effect of dimples on a golf ball. This can make the laminate sheet useful in body panels, for example in the aerospace industry. In some examples, the textured laminate sheet may be used as a spoiler on an automobile.

The textured laminate sheet may have a variety of additional uses, such as (but not limited to) in furniture (e.g. legs or surfaces of chairs or tables), fixtures (e.g. shelving), flooring, and/or sporting equipment.

Figure 1B:
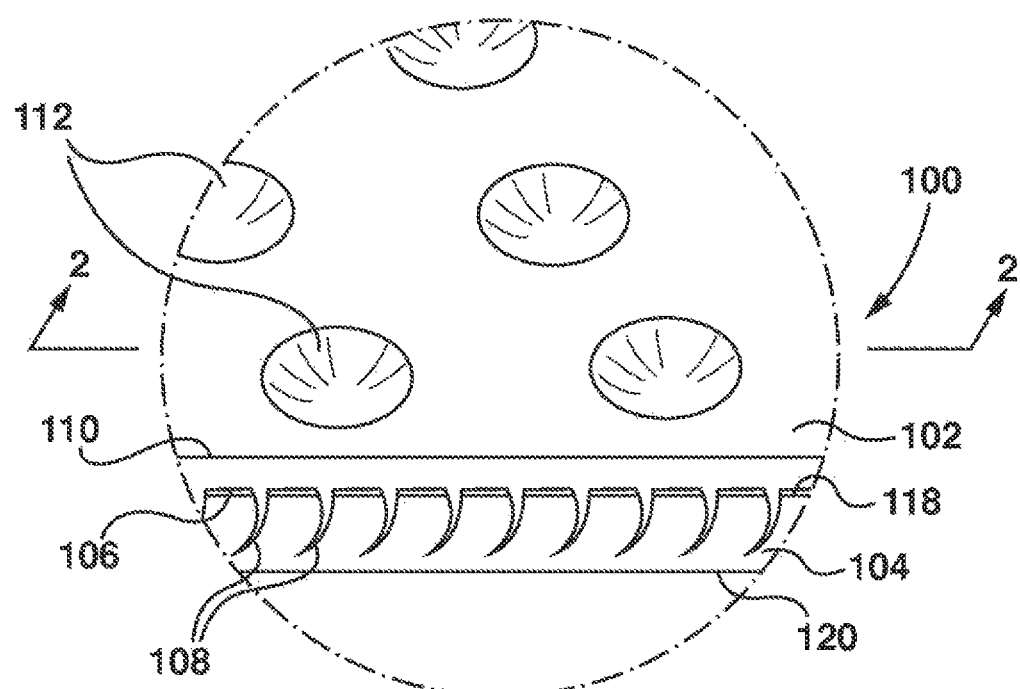
Figure 2:
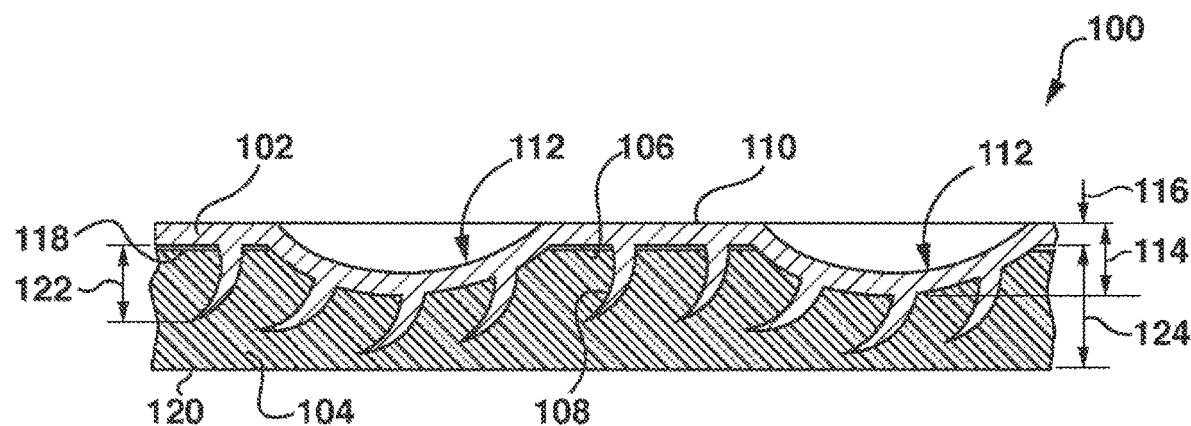
FIG. 2 is a cross-section taken along line 2-2 in FIG. 1.

Referring now to FIGS. 1a, 1b, and 2, an example textured laminate sheet 100 is shown. The textured laminate sheet 100 includes a metal sheet 102, and a substrate material 104 (which may also be provided in sheet form, for example sheet plastic). The metal sheet 102 has a barbed face 106, which includes a plurality of barbs 108, and an opposed face 110 that is opposite the barbed face 106. The substrate material 104 is adjacent the barbed face 106, and is impaled on the barbs 108 (i.e. the barbs 108 pierce into the substrate material 104). This impaling secures the metal sheet 102 and the substrate material 104 together.

A plurality of depressions 112 is formed in the opposed face 110, to texture the opposed face 110. Referring to FIG. 2, in the example shown, the depressions 112 extend from the opposed face 110, into the substrate material 104 (i.e. the depressions 112 have a depth 114, and the depth 114 is greater than a thickness 116 of the metal sheet 102). This results in a non-planar joint between the metal sheet 102 and the substrate material 104. Furthermore, in the example shown, the depressions 112 do not extend entirely through the substrate material 104. That is, in the example shown, the substrate material 104 has a first face 118 adjacent the barbed face 106, and a second face opposite the first face 120. The depressions 112 do not extend to and are not formed in the second face 120, and the second face 120 is generally non-textured.

In the example shown, the depressions 112 are arranged in a regular pattern. More specifically, the depressions are arranged in an array, and are in the form of dimples, which are generally semi-spherical. In alternative examples, the depressions may be arranged in another pattern, or at random, and may be of another shape. For example, the depressions may be generally elongate or polygonal.

Figure 3:
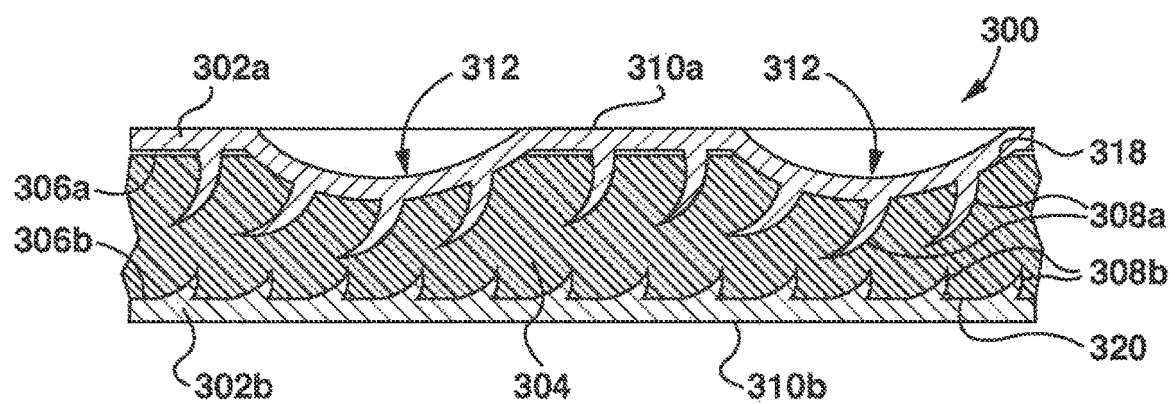
FIG. 3 is a cross-section similar to that of FIG. 2, taken through another textured laminate sheet, which includes a second metal sheet.

The metal sheet 102 may be made from a variety of metals, including but not limited to steel and aluminum. In some examples, the barbs 108 may be formed on the metal sheet 102 by gouging, such as is described in PCT Patent Application No. PCT/CA2013/000500 (Publication No. WO2013177667), to Arbesman et al. In some examples, the metal sheet 102 may be relatively thin. For example, the metal sheet 102 may have a thickness 116 of between about 1.2 mm and about 0.25 mm, or between about 1.0 mm and about 0.3 mm, or between about 0.5 mm and about 0.38 mm. The barbs 108 may be of a variety of shapes, such as hooked, or straight. The barbs 108 may be of a variety of heights 122 (where the height is the distance between the planar surface of the metal sheet 102 and the part of the barb that is furthest from this planar surface), such as between 0.5 mm and 2.5 mm, or between 0.8 mm and about 1.5 mm, or about 1.0 mm. The barbs may all lean or be curved or point in a single direction (e.g. to the left as shown in FIGS. 1 to 3), or some barbs may lean or be curved or point in different directions (e.g. some rows of barbs may lean or be curved or point to the left, and some rows of barbs may lean or be curved or point to the right). Such materials are available from GRIP Metal™ Limited (Canada) under the brand name GRIP Metal™.

The substrate material 104 may be softer than the metal sheet 102, so that it can be impaled by the barbs 108 of the metal sheet 102. Alternatively, the substrate material 104 can be softened for joining to the metal sheet 102. For example, the substrate material 104 may be softened by heating, and then joined to the metal sheet 102. The substrate material 104 may be, for example, plastic, graphite, wood, rubber, foam, metal (a softer metal than the metal sheet), cement, or a combination thereof. Non-limiting examples of plastics include polyethylene and polycarbonate. A non-limiting example of a relatively soft metal is aluminum (e.g. an aluminum substrate material may be used when the metal sheet is made from steel).

The substrate material 104 may in some examples have a thickness 124 that is greater than the thickness 116 of the metal sheet. For example, the substrate material may have a thickness 124 that is two or more times the thickness 116 of the metal sheet 102.

The substrate material 104 may in some examples have a thickness 124 that is greater than the height 122 of the barbs 108. In such examples the tips of the barbs 108 may be embedded in the substrate material 104. In other examples, the barbs 108 may have an initial height that is greater than the thickness 124 of the substrate material 104. In such examples, as the substrate material 104 and metal sheet 102 are secured together, the barbs 108 may protrude through the substrate material 104 and then be clinched or riveted (e.g. by contact with a roller or plate of the securing apparatus, or by contact with another metal sheet of the laminate).

Referring now to FIG. 3, another example textured laminate sheet 300 is shown. In FIG. 3, like features to FIGS. 1 and 2 will be referred to with like reference numerals, incremented by 200.

The textured laminate sheet 300 includes two metal sheets, which may be referred to as a first metal sheet 302a and a second metal sheet 302b, respectively. The features of the first 302a and second 302b metal sheets may be referred to herein with the prefixes "first" and "second", respectively, and the reference numerals for these features may include the suffixes "a" and "b", respectively (e.g. the first metal sheet 302a has a first barbed face 306a and the second metal sheet 302b has a second barbed face 306b). The first metal sheet 302a and the second metal sheet 302b sandwich the substrate material 304, so that the first metal sheet 302a is secured to a first face 318 of the substrate material 304, and the second metal sheet 302b is secured to the second face 320 of the substrate material 304. The substrate material 304 is impaled by the barbs 308a of the first metal sheet 302a and also by the barbs 308b of the second metal sheet 302b.

In the example shown, the barbs 308a of the first metal sheet 302a are of a different shape and size from the barbs 308b of the second metal sheet 302b. In alternative examples, the barbs 308a of the first metal sheet 302a and the barbs 308b of the second metal sheet may be the same shape and/or the same size.

In the example shown, the opposed face 310a of the first metal sheet 302a is textured with a plurality of depressions 312, and the opposed face 310b of the second metal sheet 302b is non-textured.

In alternative examples, the opposed face 310b of the second metal sheet 302b may also be textured with a plurality of depressions.

Figure 4A:
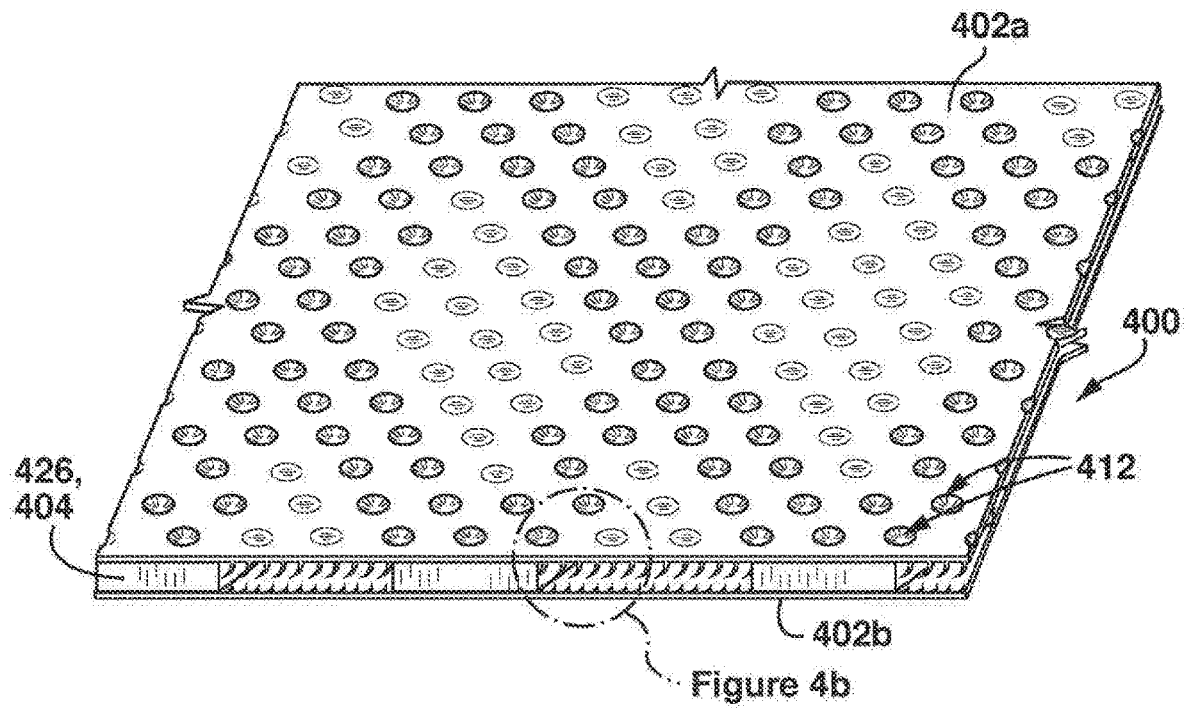
FIG. 4a is a partial perspective view of another textured laminate sheet.
Figure 4B:
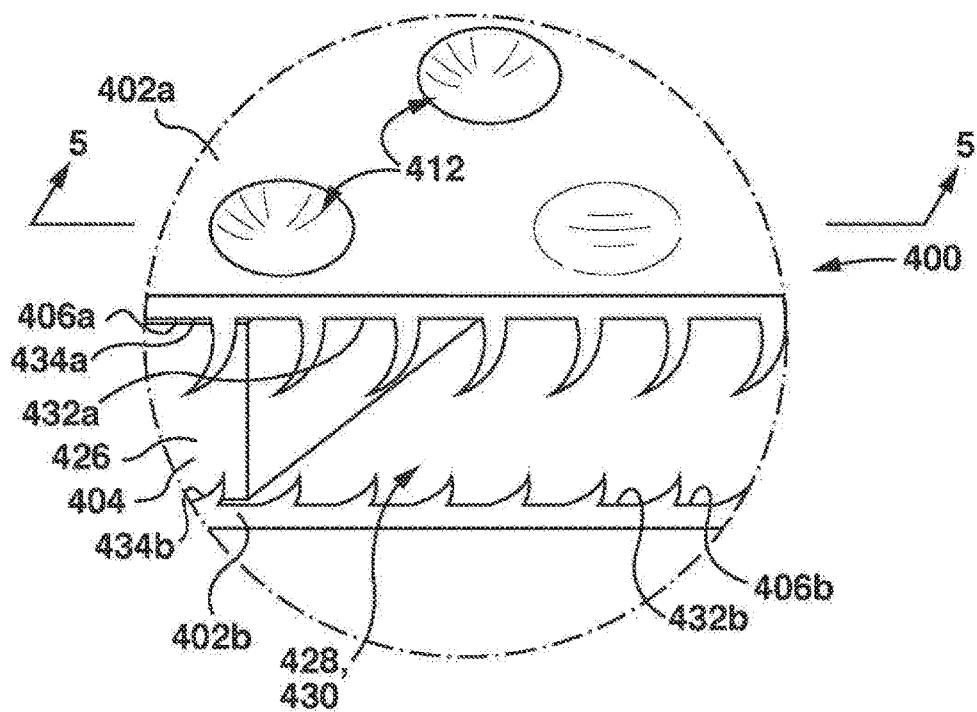
Figure 5:
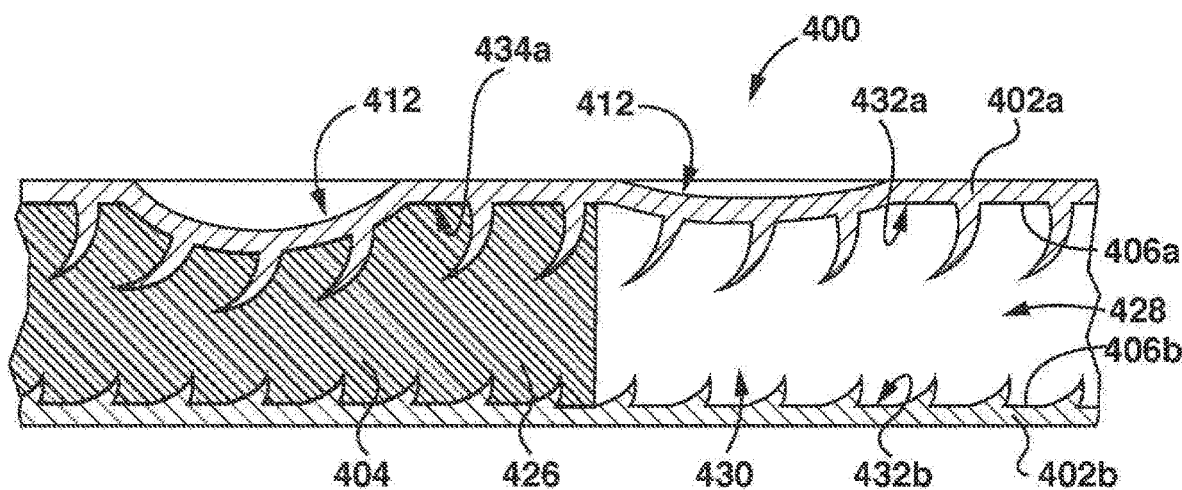
FIG. 5 is a cross-section taken along line 5-5 in FIG. 4.

Referring now to FIGS. 4a, 4b, and 5, another example of a textured laminate sheet 400 is shown. In FIGS. 4a, 4b, and 5, like features to FIGS. 1 and 2 will be referred to with like reference numerals, incremented by 300.

Similarly to the textured laminate sheet 300 of FIG. 3, the textured laminate sheet 400 includes a first metal sheet 402a and a second metal sheet 402b, and features of the first 402a and second 402b metal sheets may be referred to herein with the prefixes "first" and "second", respectively, and the reference numerals for these features may include the suffixes "a" and "b", respectively.

Figure 6:
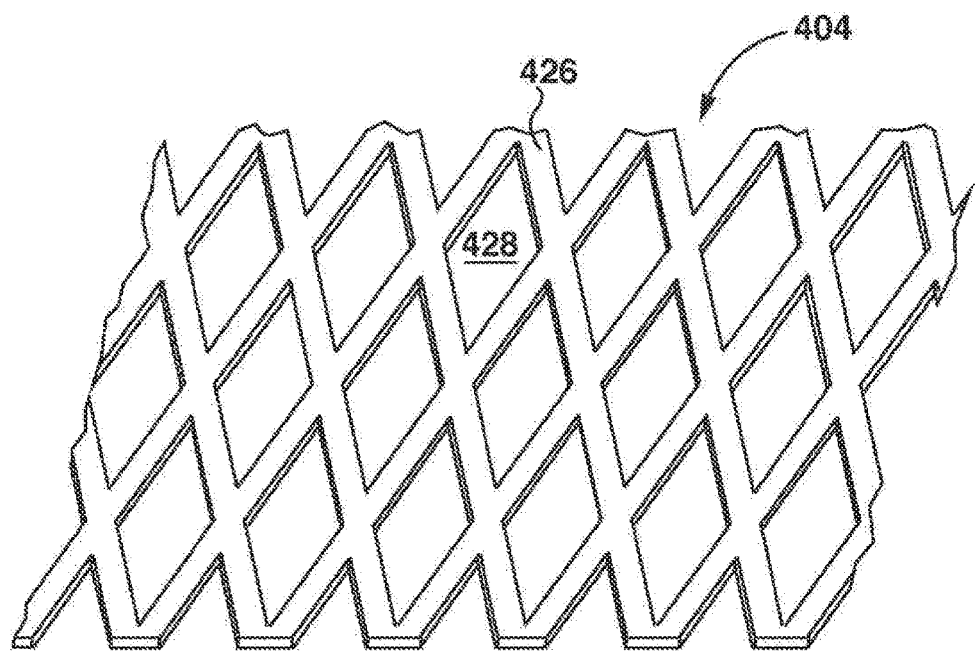
FIG. 6 is a partial perspective view of a substrate material used in the textured laminate sheet of FIGS. 4 and 5.

In the textured laminate sheet 400, the substrate material 404 is a latticed sheet 426, which is shown separately in FIG. 6, prior to assembly into the textured laminate sheet 400. As used herein, the term "latticed sheet" refers to a sheet that has openings therethrough. Such openings may be diamond shaped openings 428, as shown in FIG. 6, or another shape. Accordingly, in the example shown, the surface area of the first 418 and second 420 faces of the substrate material 404 is less than the footprint of each respective barbed face 406a, 406b (also referred to as a "barbed face footprint").

Referring to FIGS. 4b and 5, in the example shown, the textured laminate sheet 400 has hollow portions 430, corresponding to the openings 428 in the latticed sheet 426. The barbed faces 406a, 406b of the metal sheets 402a, 402b have "naked" portions 432a, 432b (i.e. portions that are not secured to the substrate material) corresponding to the openings 428 in the latticed sheet 426.

In the example of FIGS. 4a, 4b, and 5, the depressions 412 are fully formed in the non-naked portions 434a of the first metal sheet 402a. In the naked portions 432a, the depressions 412 are only partially formed (i.e. have a lesser depth than the depressions in the non-naked portions), since there is no substrate material supporting the naked portions 432a during the debossing operation.

The textured laminate sheet of FIGS. 4a, 4b, and 5 may be lighter in weight than other laminates, due to the hollow portions, while also being strong and stiff.

Figure 7:
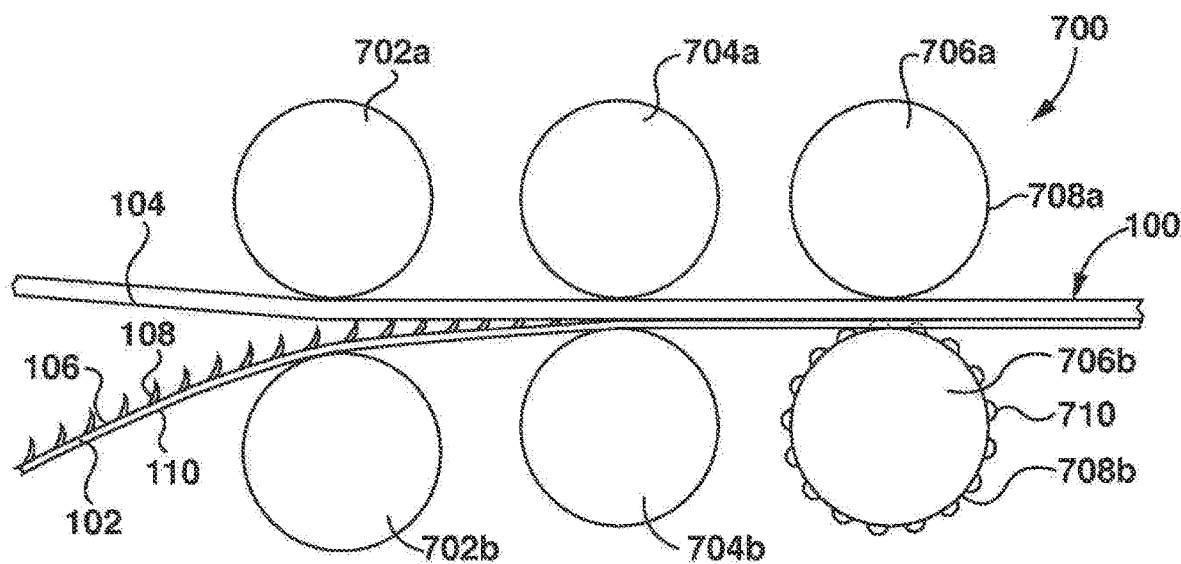
FIG. 7 is a schematic view of a securing and texturing apparatus, shown in use manufacturing the textured laminate sheet of FIG. 1.

Referring now to FIG. 7, an example of a securing and texturing apparatus 700 is shown. The securing and texturing apparatus 700, and a method of its operation, will be described with respect to the textured laminate sheet 100 of FIGS. 1a, 1b, and 2, and the textured laminate sheet 300 of FIG. 3. However, the securing and texturing apparatus 700 may be operated according to other methods, and may be used to produce alternative textured laminate sheets. Furthermore, the described methods may be used with other apparatuses, and to produce alternative textured laminate sheets. Furthermore, the textured laminate sheet 100 may be produced by other apparatus and other methods.

In the example shown, the securing and texturing apparatus 700 includes a pair of heating rollers 702a, 702b, a pair of securing rollers 704a, 704b downstream of the pair of heating rollers 702a, 702b, and a pair of texturing rollers 706a, 706b downstream of the pair of securing rollers 704a, 704b. The securing and texturing apparatus 700 secures the substrate material 104 and the metal sheet 102 together as a laminate sheet, and debosses the opposed face 110 to texture the laminate sheet with depressions 112 (not visible in FIG. 7).

Referring still to FIG. 7, the substrate material 104 and the metal sheet 102 may be passed between the pair of heating rollers 702a, 702b, with the substrate material 104 positioned adjacent the barbed face 106 of the metal sheet 102. For example, the substrate material 104 and the metal sheet 102 may each be fed from a respective storage reel (not shown) towards the heating rollers 702a, 702b, and then pass between the heating rollers 702a, 702b. One or both of the heating rollers 702a, 702b, may be heated, and may serve to heat one or both of the metal sheet 102 and the substrate material 104. Depending on the pressure (if any) applied by the heating rollers 702a, 702b, the barbs 108 of the metal sheet 102 may partially impale the substrate material 104 as they pass between the heating rollers 702a, 702b.

From the heating rollers 702a, 702b, the metal sheet 102 and the substrate material 104 may pass towards and between the pair of securing rollers 704a, 704b. The securing rollers 704a, 704b receive the substrate material 104 and the metal sheet 102, and apply pressure to force the substrate material 104 and the metal sheet 102 together to impale the substrate material 104 on the barbs 108 of the metal sheet 102, to secure the substrate material 104 and the metal sheet 102 together as a laminate sheet.

From the securing rollers 704a, 704b, the laminate sheet passes towards and between the pair of texturing rollers 706a, 706b (also referred to as a first roller 706a, and a second roller 706b). In the example shown, the first roller 706a has a generally flat contact surface 708a, and the second roller 706b has a contact surface 708b with raised features 710. The raised features 710 can be, for example, an array of dimple negatives. The texturing rollers 706a, 706b receive the laminate sheet, and as the laminate sheet passes between the first 706a and second 706b roller, the raised features 710 are pressed into the metal sheet 102 to deboss the laminate sheet (i.e. to deboss the opposed face 110) and form the plurality of depressions 112 in the laminate sheet.

In the example shown, as the contact surface 708a of the first roller 706a is generally flat, the second face 120 of the substrate material 104 is maintained as planar and non-textured. In alternative examples, the contact surface of the second roller may also be textured, for example with the same shape and pattern of raised features as the second roller, or with a different shape and pattern of raised features. This may result in a laminate sheet that is textured on two opposed faces.

In alternative examples, the heating rollers 702a, 702b may be omitted, and the securing and texturing may be carried out without heating the substrate material and metal sheet. In further alternative examples, the substrate material 104 and metal sheet 102 may be pre-heated by an apparatus that is separate from the securing rollers and texturing apparatus 700.

In further alternative examples, the texturing rollers 706a, 706b may be part of a standalone texturing apparatus. For example, the laminate sheet may be formed (e.g. by a pair of standalone securing rollers), and then stored. At a later time, the laminate sheet may be taken from storage to the texturing apparatus, for debossing with the depressions. In such examples, the laminate sheet may optionally be heated prior to debossing.

The securing and texturing apparatus 700 of FIG. 7 may generally be operated continuously, to create a continuous textured laminate sheet.

Figure 8:
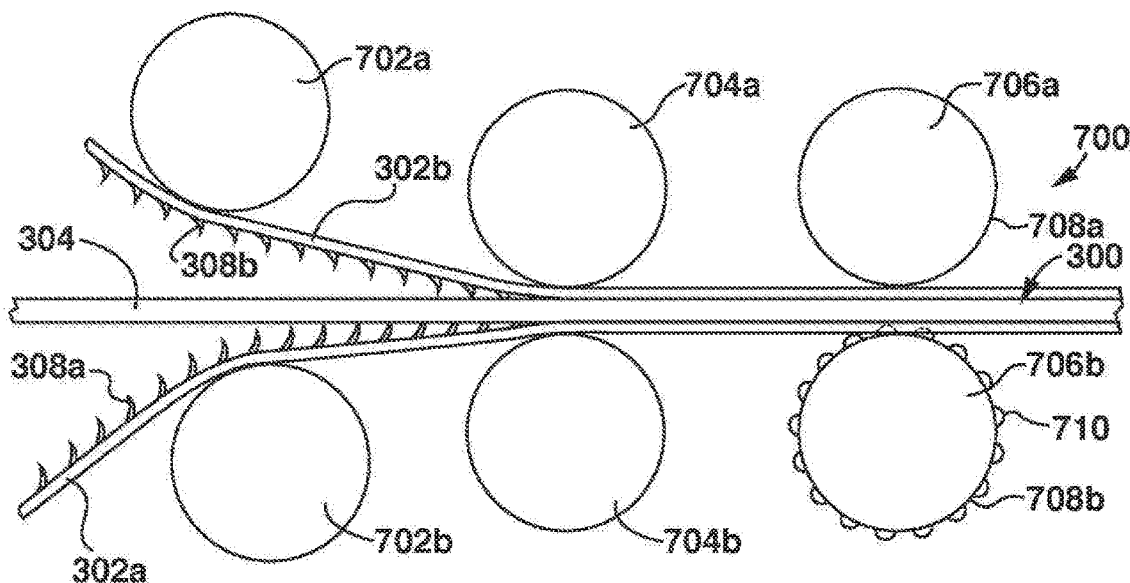
FIG. 8 is a schematic view of the securing and texturing apparatus of FIG. 7, shown in use manufacturing the textured laminate sheet of FIG. 3.

As mentioned above with regards to FIG. 3, the textured laminate sheet 300 includes two metal sheets 302a, 302b that sandwich the substrate material 304. FIG. 8 shows an example of the formation of textured laminate sheet 300, with the same apparatus 700 as used in FIG. 7. In this example, the second metal sheet 302b is fed between the heating rollers 702a, 702b together with the substrate material 304 and first metal sheet 302a. The second metal sheet 302b is then fed between the securing rollers 704a, 704b with the substrate material 304 and first metal sheet 302a, so that the second metal sheet 302b is secured to the substrate material 304 concurrently with the first metal sheet 302a, by concurrently forcing the first metal sheet 302a and the substrate material 304 together and forcing the second metal sheet 302b and the substrate material 304 together. The substrate material 304 is impaled on the barbs 308a of the first metal sheet 302a and the barbs 308b of the second metal sheet 302b.

Figure 9:
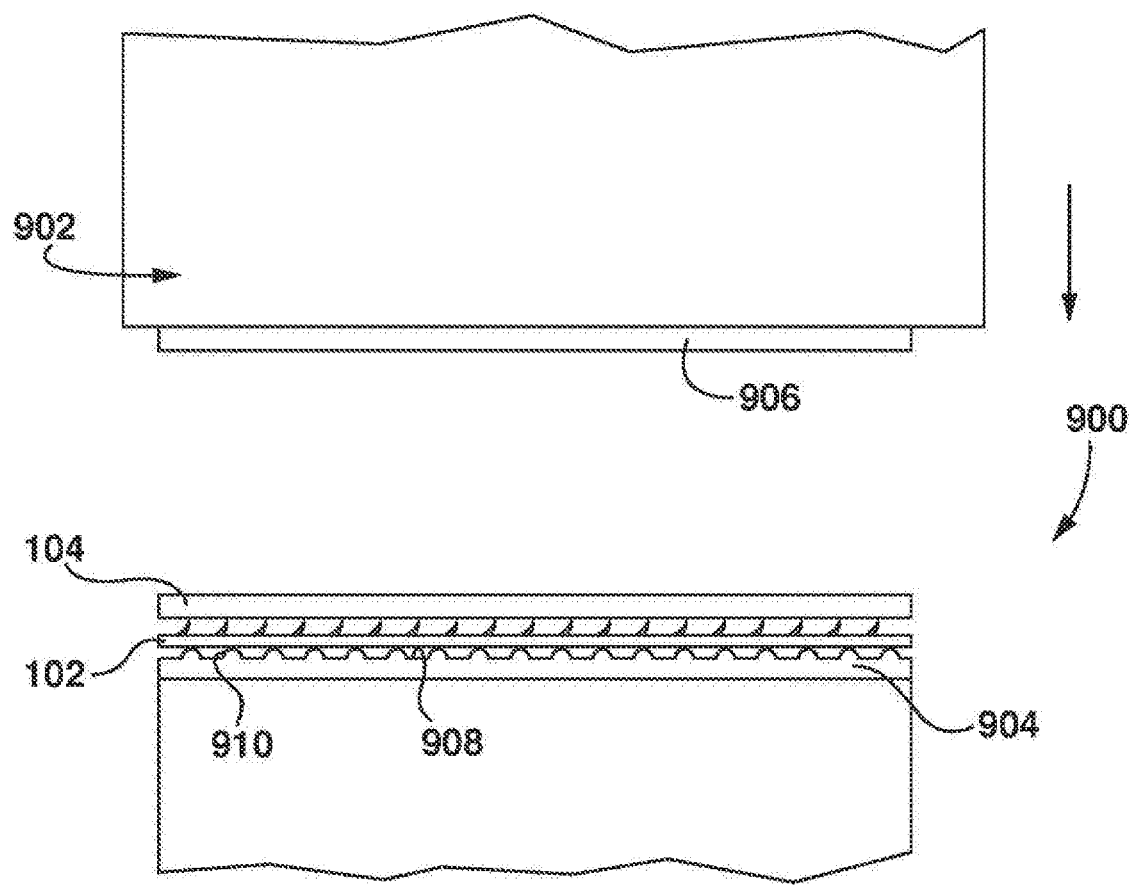
FIG. 9 is a schematic view of another securing and texturing apparatus, shown in a first stage of operation to manufacture the textured laminate sheet of FIG. 1.
Figure 10:
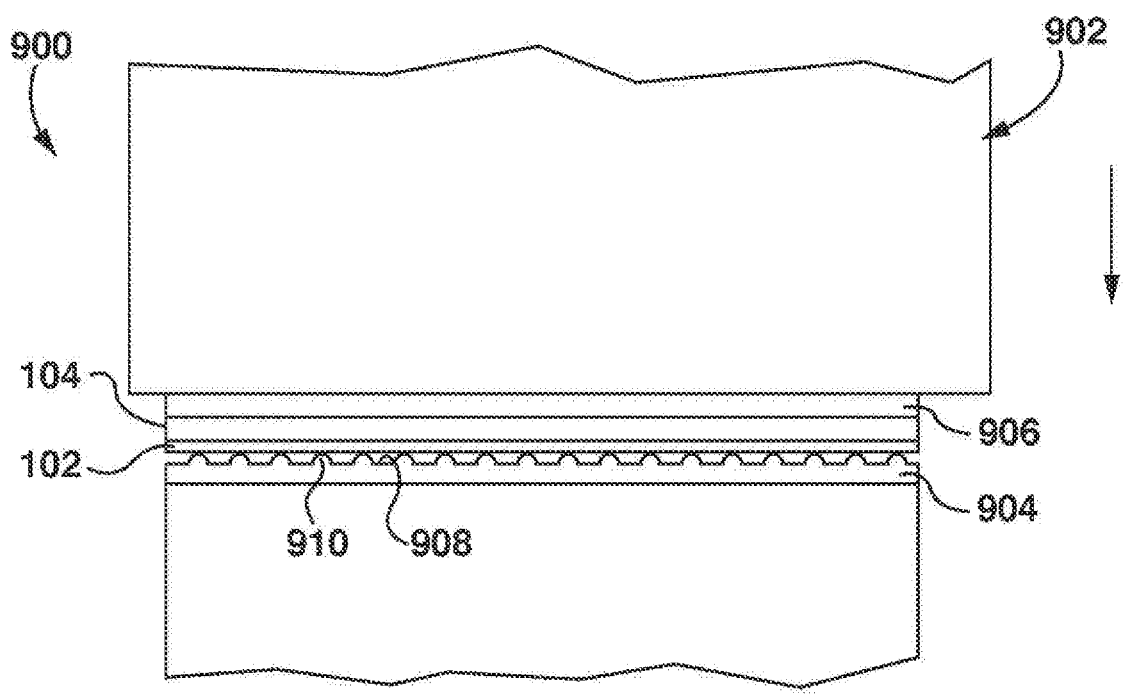
FIG. 10 is a schematic view of the securing and texturing apparatus of FIG. 9, where the apparatus has completed the first stage of operation and is beginning a second stage of operation.
Figure 11:
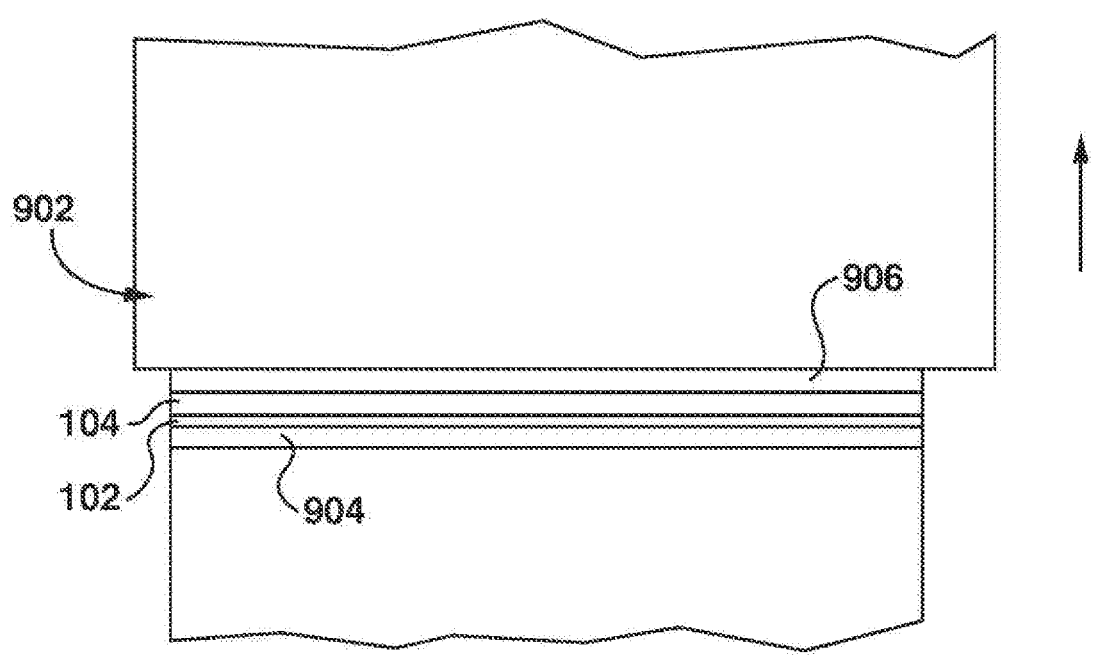
FIG. 11 is a schematic view of the securing and texturing apparatus of FIGS. 9 and 10, where the apparatus has completed the second stage of operation.

Referring now to FIGS. 9 to 11, an alternative example of a securing and texturing apparatus 900 is shown. The securing and texturing apparatus 900, and a method of its operation, will be described with respect to the textured laminate sheet 100 of FIGS. 1a, 1b, and 2; however, the securing and texturing apparatus 900 may be operated according to other methods, and may be used to produce alternative textured laminate sheets.

In this example, the securing of the metal sheet 102 to the substrate material 104 and the texturing of the resulting laminate is carried out by a single press, by actuating the press to force a plate against the metal sheet and the substrate material to impale the substrate material on the barbs and then deboss the opposed face. Specifically, referring to FIG. 9, in the example shown, the securing and texturing apparatus 900 includes a press 902, and a pair of plates mounted in the press. The plates include a lower plate 904 and an upper plate 906. In the example shown, the lower plate 904 has a contact surface 908 with raised features 910. The raised feature 910 can include, for example, an array of dimple negatives. The lower plate 904 receives the substrate material 104 and the metal sheet 102, with the metal sheet 102 resting on the lower plate 904 and the substrate material 104 resting on the metal sheet 102, so that the barbed face 106 is adjacent the substrate material 104. The upper plate 906 is generally planar, and is mounted to the press 902 above the lower plate 904.

In the example shown, the press 902 is operable in two stages. Referring to FIGS. 9 and 10, in the first stage, the upper plate 906 is moved a first distance with respect to the lower plate 904, to force the substrate material 104 towards the metal sheet 102 and impale the substrate material 104 on barbs 108 of the metal sheet 102. Referring to FIG. 11, in the second stage, the upper plate 906 is moved a second distance with respect to the lower plate 904 to deboss the metal sheet 102 with the raised features 910 of the lower plate 904. The upper plate 906 may then be raised, away from the resulting textured laminate sheet 100.

In alternative examples, the upper plate may include the raised features, and the lower plate may be generally flat.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

The invention claimed is:

1. A textured laminate sheet comprising:
   a) a metal sheet having a barbed face with a plurality of barbs, and an opposed face opposite the barbed face, wherein the metal sheet has a metal sheet thickness;
   b) a substrate material adjacent the barbed face and impaled on the plurality of barbs, wherein the substrate material is a latticed sheet having openings therethrough; and
   c) a plurality of depressions formed in and texturing the opposed face, such that the plurality of depressions are formed over the plurality of barbs to cause the plurality of barbs to further penetrate into the substrate material in areas without the openings; and wherein the plurality of depressions have a depth greater than the metal sheet thickness.

2. The textured laminate sheet of claim 1, wherein at least some of the depressions extend from the opposed face into the substrate material.

3. The textured laminate sheet of claim 1, wherein the substrate material has a first face adjacent the barbed face, and a second face opposite the first face, and the second face is non-textured.

4. The textured laminate sheet of claim 1, wherein the depressions are arranged in a regular pattern.

5. The textured laminate sheet of claim 1, wherein the plurality of depressions comprise an array of dimples.

6. The textured laminate sheet of claim 1, wherein:
   i) the barbed face has a barbed face footprint;
   ii) the substrate material has a first face adjacent the barbed face, and the first face has a first face surface area; and
   iii) the first face surface area is less than the barbed face footprint.

7. The textured laminate sheet of claim 1, wherein the substrate material has a substrate material thickness, and the metal sheet thickness is less than the substrate thickness.

8. The textured laminate sheet of claim 1, wherein the substrate material comprises at least one of plastic, rubber, wood, foam, metal or a combination thereof.

9. The textured laminate sheet of claim 1, wherein (i) the metal sheet is secured to a first face of the substrate material, (ii) the substrate material further comprises a second face opposite the first face, (iii) the textured laminate sheet further comprises a second metal sheet having a second barbed face with a second plurality of barbs, and a second opposed face, and (iv) the second face of the substrate material is impaled on the second plurality of barbs to secure the substrate material to the second metal sheet.

10. The textured laminate sheet of claim 1, wherein the textured laminate sheet further comprises a second metal sheet that is non-textured.

\* \* \* \* \*